Jan. 28, 1969   M. STOLOVE ET AL   3,424,056
KEY DUPLICATING MACHINE
Filed Aug. 1, 1966   Sheet 1 of 5

INVENTORS.
SAMUEL J. STOLL
MARTIN STOLOVE
BY
ATTORNEY

INVENTORS.
SAMUEL J. STOLL
MARTIN STOLOVE
BY
ATTORNEY

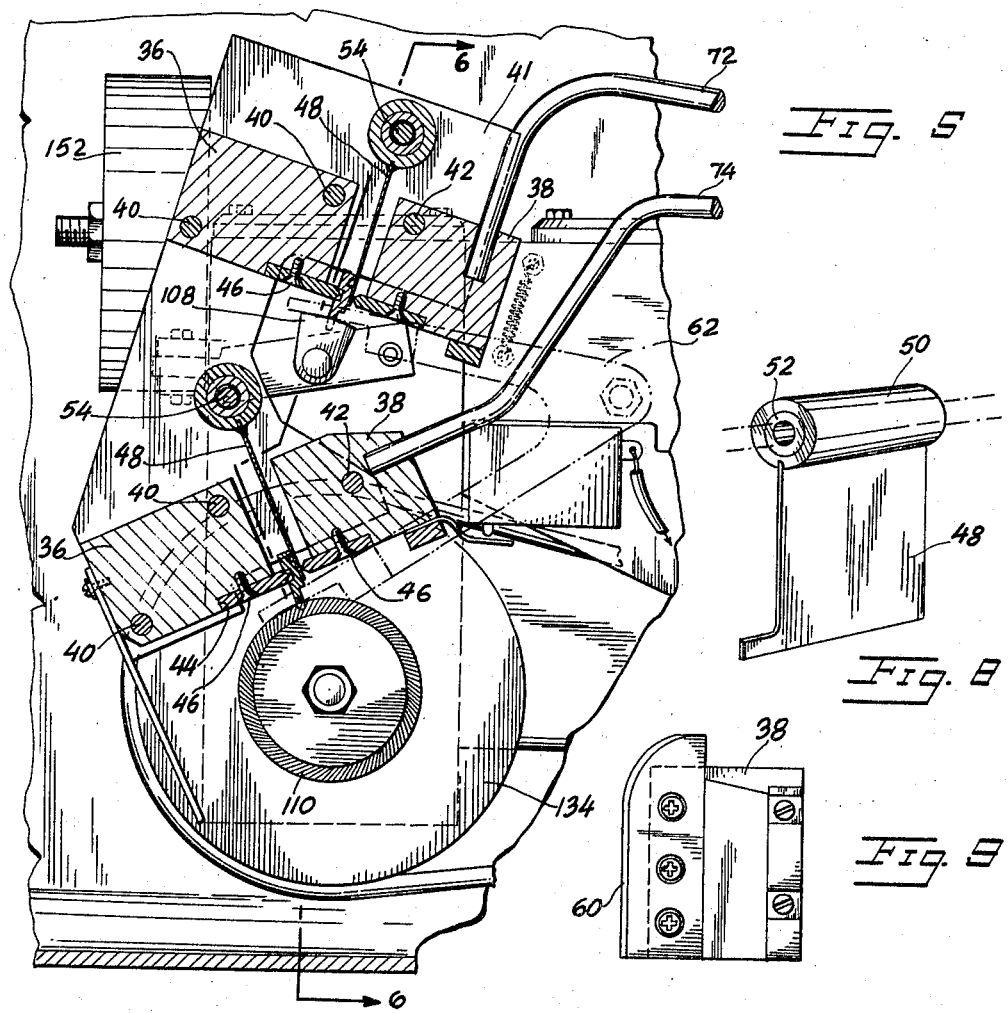
Fig. 6
Fig. 8
Fig. 9
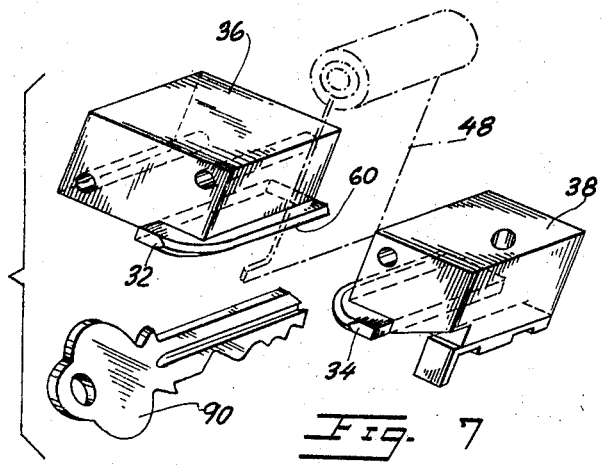
Fig. 7
INVENTORS.
SAMUEL J. STOLL
MARTIN STOLOVE
BY
ATTORNEY

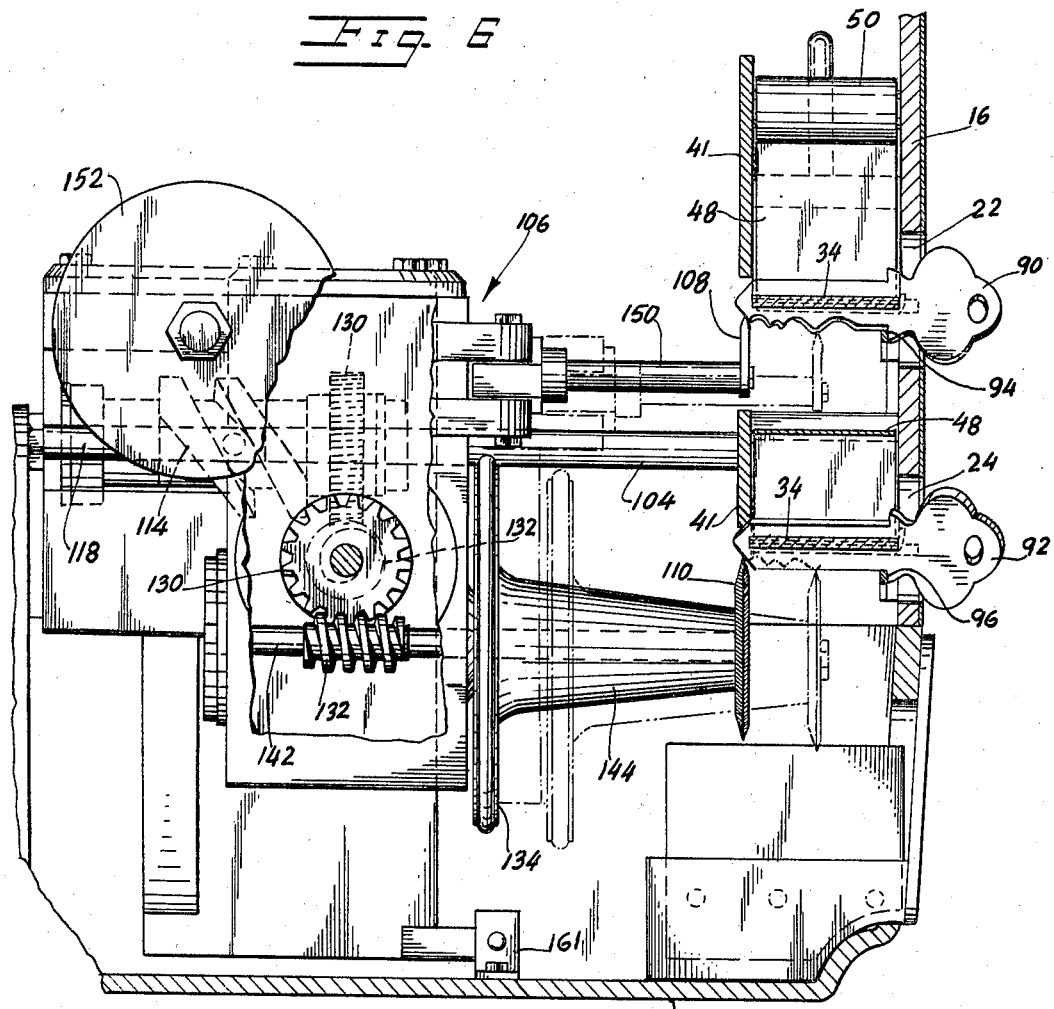
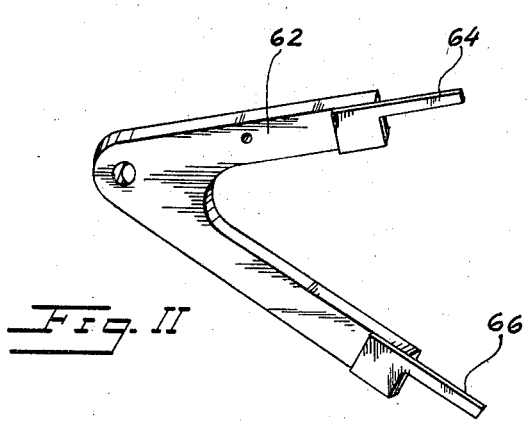

INVENTORS.
SAMUEL J. STOLL
MARTIN STOLOVE
BY
ATTORNEY 3,424,056
KEY DUPLICATING MACHINE
Martin Stolove, 129 S. Virginia St., Atlantic City, N.J. 08401, and Samuel J. Stoll, 216—19 Sawyer Ave., Queens Village, N.Y. 11427
Filed Aug. 1, 1966, Ser. No. 569,383
U.S. Cl. 90—13.05    10 Claims
Int. Cl. B23c *1/16, 1/18*

ABSTRACT OF THE DISCLOSURE

A key duplicating machine having key clamping jaws which may be provided with tapered facing edges engageable with the longitudinal grooves in a key, a key supporting plate mounted between said jaws and clamping means adapted to clamp the jaws against the plate and on a key mounted between the plate and one of the jaws. A carriage bearing both a key follower and a key cutter moves lengthwise of the key master and the key blank, both master and blank being clamped as aforesaid.

---

This invention relates to a key duplicating machine which is capable of duplicating both double bitted and single bitted keys.

Conventional key duplicating machines are capable of accurately duplicating single bitted keys but no conventional machine is known which is capable of accurately duplicating double bitted keys. The reason is this: conventional key duplicating machines utilize the back edge of a key as the indexing line or frame of reference. The back edge is precisely parallel to the longitudinal groove which aligns the key in a lock. Double bitted keys, however, have no back edge which may be used for indexing purposes. Instead, they are provided along both edges with a series of teeth of varying heights and wards of varying depths. A line drawn across the two highest teeth is not necessarily parallel to the longitudinal indexing groove of the key. It is accordingly necessary, in conventional key duplicating machines, to visually and manually adjust double bitted keys to compensate for this absence of precise parallelism. Since such adjustment depends upon the skill of the individual locksmith, the end result necessarily lacks precision.

In the present key duplicating machine the longitudinal groove which aligns both double bitted and single bitted keys in their respective locks is used as the indexing line or frame of reference for the cutting operations. This does not require any special skill on the part of the locksmith, since it is a feature and a factor of the machine itself. It follows that precision duplication of keys may be effected by the use of the present machine without the inaccuracies which normally accompany the human element.

An important feature of the present invention resides in its use of the combination of a pair of opposing clamping jaws which are capable of engaging the longitudinal grooves of a key and a plate mounted between said jaws to support the side of the key. It will be understood that both double bitted and single bitted keys are frequently and even generally provided with longitudinal grooves on opposite sides thereof. The grooves on one side are not necessarily aligned with the grooves on the other side, and usually they are not. Consequently, when oppositely formed grooves are engaged by oppositely disposed clamping jaws (such jaws being themselves aligned), the key is twisted between the jaws relative to the cutting wheel. This would preclude a square cut. In the present invention only one clamping jaw engages a groove on one side of the key and the above mentioned plate is interposed between the opposite side of the key and the opposite clamping jaw. The plate supports the key in proper position relative to the cutting wheel and prevents the twisting moment above mentioned. The key may be inserted on either side of the plate so as to engage either of the two clamping jaws. This renders it possible to cut both side edges of the key seriatim.

Another important object of the present invention is the provision of a fully automatic key duplicating machine which is capable of cutting both double bitted and single bitted keys. In the present invention the keys are inserted into the machine in the manner aforesaid, that is, between a clamping jaw on one side and a clamping jaw and supporting plate on the opposite side, and the machine then automatically clamps the keys in place, duplicates them and finally releases them, all of this without any manual guidance on the part of the operator.

The present invention is illustrated in the accompanying drawing in which FIGURE 1 is a perspective view of a key duplicating machine made in accordance with this invention.

FIGURE 5 is an enlarged fragmentary view showing the key clamping, following and cutting components of the machine, such showing being partly in section.

FIGURE 6 is another vertical section through the machine showing the relationship between the key following and key cutting components.

FIGURE 7 is a perspective exploded view showing the key clamping jaws in relation to the hanging key support plate and a key.

FIGURE 8 is a perspective view of said hanging key support plate.

FIGURE 9 is a view of one of the key clamping jaws.

FIGURE 11 is a perspective view of the key follower.

Figure 3:
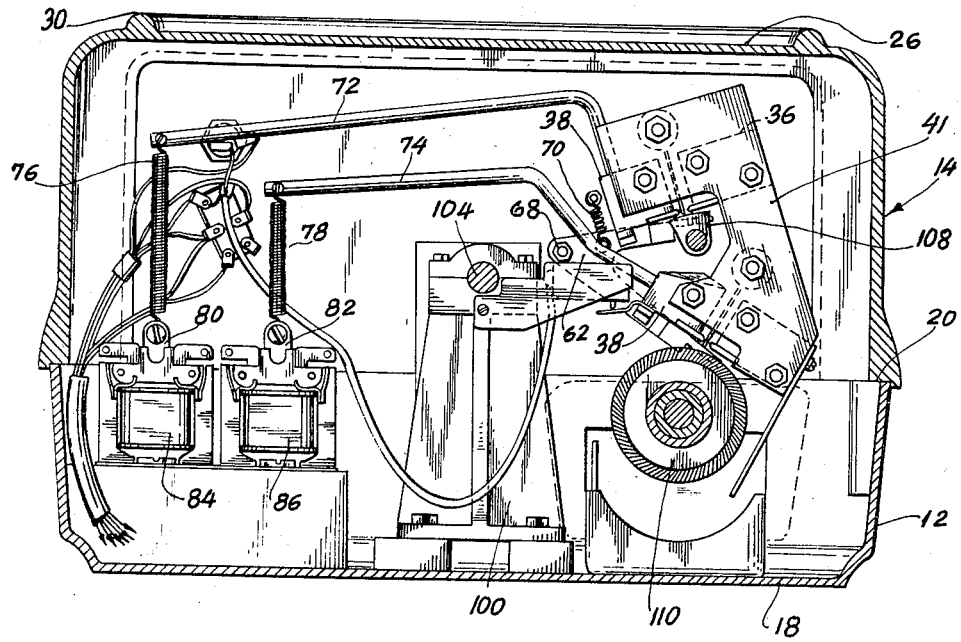
FIGURE 3 is a vertical section therethrough on the line 3—3 of FIGURE 1.

Turning now to the details of the invention, as illustrated in the accompanying drawing, it will be seen that a key duplicating machine 10 made in accordance with the principles of this invention is provided with a housing 12 including a cover 14 and a front plate 16. Housing 12 is closed at the bottom and all sides but open at the top. Its bottom wall 18 and the front plate 16 support all of the working parts of the machine. For convenience in manufacture housing 18 is a metal casting while front plate 16 is a machined plate suitably supported on the housing. The top cover is removably mounted on housing 12 and it is provided with a front opening to accommodate the front plate 16. Also for convenience in manufacture, the top cover is a metal casting which is rabbeted along its lower edges 20 for seating on the corresponding upper edges of housing 12. This is clearly shown in FIGURE 3.

The use of housing 12, front plate 16 and cover 14 renders the entire machine portable and convenient to handle. The housing and its cover and front plate also serve to protect the working parts of the machine and to protect the operator of the machine from injury, resulting either directly from contact with the working parts or indirectly from metal shavings thrown up by the key cutter. The only exposed parts (aside from switches) are the key clamping jaws and key supporting plates between them, said jaws and plates being exposed through openings 22 and 24 in the front plate 16. There are many other important features in the closed machine arrangement hereinabove described, not the least of which is the fact that the top wall 26 of cover 14 may be used as a table top for keys and key blanks. A raised bead or ridge 30 is provided on the top wall 26 of cover 14 along all four side edges in order to prevent the keys and key blanks from accidentally slipping off the cover.

As has above been indicated, the present machine is provided with two sets of key clamping jaws, each set comprising a pair of jaws 32 and 34, respectively, removably mounted on blocks 36 and 38, respectively. Blocks 36 are fixedly secured to the inside wall of face plate 16 adjacent holes 22 and 24. Bolts 40 and plate 41 may be used for this purpose, blocks 36 being clamped between said plate 41 and front plate 16. Blocks 38 are pivotally secured between face plate 16 and plate 41, also adjacent holes 22 and 24. Bolts 42 may be used for this purpose. It will be noted that each of blocks 36 and 38 is provided with a recess 44 to receive clamping jaws 32, 34. Screws 46 may be used to removably secure said clamping jaws to said blocks. A key supporting plate 48 is provided between each pair of key clamping jaws and it will be observed that each said plate is supported at its upper end from a tubular member 50 mounted on a bushing 52 supported by a pin or screw 54 between plate 41 and the inside wall of face plate 16. These two plates 48 are free to swing about the longitudinal axis of pin or screw 54.

It will now be understood that the clamping edges 60 of the several key clamping jaws 32, 34 are situated opposite each other in parallel relation to each other and parallel to the longitudinal axis of pins or screws 54, which pins or screws are perpendicular to the face plate 16.

Also mounted on the inside of face plate 16 is a bracket 62 which supports a pair of key stops 64 and 66, respectively. Bracket 62 is essentially a bifurcated member which is pivotally mounted on said face plate by means of a bolt 68 (see FIGURE 3). The two key stop members 64 and 66 are located at the two ends of the bifurcated bracket 62 opposite the pivotal end thereof. A spring 70 is connected at one end of one of the arms of said bifurcated bracket 62 and at the other end to the front plate 16. The function of spring 70 is to urge the two key stop members 64 and 66 upwardly (counterclockwise as viewed in FIGURE 3).

Bars 72 and 74 are secured respectively at one end to blocks 38. The opposite ends of said bars 72 and 74 are attached to springs 76 and 78, respectively, which are themselves secured to plungers 80 and 82 of solenoids 84 and 86. When the solenoids are energized they pull downwardly upon the free ends of bars 72 and 74 through springs 76 and 78. This has the effect of pivoting blocks 38 in counterclockwise direction, as viewed in FIGURE 3, and clockwise direction, as viewed in FIGURE 5. This causes key clamping jaws 34 to move in the direction of key supporting plate 48 and key clamping jaws 32. As will shortly be seen, this urges key clamping jaws 34 into clamping position.

Figure 10:
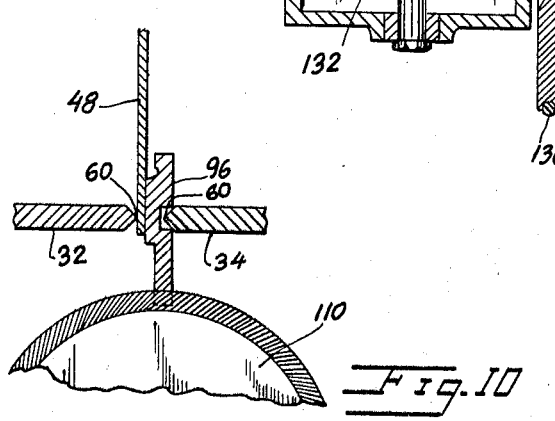
FIGURE 10 is a detailed section showing a key clamped between a clamping jaw on one side and another clamping jaw and the supporting plate on the other side.

In the operation of this device a master key 90 is inserted through hole 22 into the space between one of the jaws 32, 34 and plate 48 behind hole 22. As viewed in FIGURE 5, the master key in the illustrated operation of the invention is placed between jaw 32 and supporting plate 48. The key engaging edge 60 of jaw 32 engages one of the longitudinal grooves in the key. It will be observed in FIGURE 10 that this key engaging edge 60 is tapered to fit into the groove of the key. It is also rounded at the entrance to the jaw in order to facilitate insertion of the key.

As the key enters between jaw 32 and plate 48, it cams the upper key stop 64 downwardly, and since this key stop is connected to the same bracket 62 as the lower key stop 64, both key stops are in effect cammed downwardly by the insertion of master key 90.

Key blank 92 may be inserted between jaw 32 and plate 48 on the lower block 36. The very same method of inserting the master key between the upper jaw 32 and upper plate 48 is used in inserting the key blank between the lower jaw 32 and the lower plate 38. As a matter of preference or convenience, it may be found desirable to insert the key blank first, because it is provided with a smooth continuous lower edge. It is therefore easier to slide the key blank along key stop 66 than it is to slide the toothed master key 90 along upper key stop 64. The function of the two key stops is clearly shown in FIGURE 6, where it will be observed that they serve as stop members relative to shoulders 94 and 96 of the master key and key blank, respectively. Both keys are thereby inserted an identical distance into the machine and their respective shoulders occupy a common vertical plane.

Since the grooves of the two keys engage the clamping edges of jaws 32, both keys are maintained in precise parallelism. This, of course, is crucially important in any key cutting operation.

Mounted between two brackets 100 and 102, which are secured to the bottom wall 18 of housing 12, is a horizontal shaft 104. This shaft supports carriage 106 which carries the master key follower 108 and the blank key cutter 110 and the entire drive mechanism of the machine. More particularly, carriage 106 is provided with a pair of bushings 112 on shaft 104 which permit the carriage to move linearly along said shaft and also angularly about its longitudinal axis. Mounted in said carriage about shaft 104 is a cam 114. Engaging said cam is a cam follower 116 mounted on a bar 118 which is secured to bracket 102. Bar 118 is provided with a threaded portion 120 which is adjustably secured to bracket 102 by means of adjusting nuts 122. It is accordingly possible to adjust the position of cam follower 116 either forwardly or rearwardly along the axis of shaft 102.

Cam 114 is connected through a first worm gear drive 130 and a second worm gear drive 132 to a first pulley 134 which is connected by a belt 136 to a second pulley 138 on the shaft of motor 140. Suitable housings and brackets are provided in carriage 106 for the first and second worm gear drives 130 and 132 and motor 140.

It will now be observed that when motor 140 is energized it drives the two worm gear drives through the two pulleys 138 and 134 and belt 136. This in turn drives cam 114 and causes it to rotate relative to fixed cam follower 116. Cam 114 is free to rotate on shaft 104 and it is also free to move linearly along said shaft. It is also free to rotate relative to the carriage housing. However, it is fixed against linear movement relative to the carriage. Consequently, when the motor drives the cam in the manner aforesaid, it causes the cam to rotate about the axis of shaft 104 and to move linearly along said axis. This causes corresponding linear movement of the carriage. The cam is continuous in that it causes the carriage to move linearly first in one direction (toward the front of the machine) and then in the opposite direction (toward the back of the machine). It is therefore unnecessary to reverse the direction of rotation of the motor in order to reverse the direction of linear movement of the carriage. When the cam rotates 180 degrees, the movement is forward; the succeeding 180 degrees of rotation causes rearward movement.

Worm gear drive 132 includes a shaft 142 which supports pulley 134 and key cutter 110. This pulley is provided with a generally conical formation 144 which projects forwardly and serves as an abutment for said cutter 110. It will therefore be evident that when pulley 134 is caused to rotate by means of motor 140, pulley 138 and belt 136, key cutter 110 will similarly be caused to rotate and, as will shortly be seen, to engage in a key cutting operation. Key follower 108 is adjustably secured to a bar 150, which itself is adjustably secured to carriage 106. Angular and generally vertical and horizontal adjustments are provided.

What holds key follower 108 against master key 90 is the weight of motor 140. As viewed in FIGURE 2, motor 140 urges in downward direction that portion of carriage 106 which is situated to the right of shaft 104. The portion of the carriage which is situated to the left of said shaft is thereby urged in upward direction. Since key follower 108 is situated on said lefthand portion of the carriage (as viewed in FIGURE 2), it is thereby elevated into position for engagement with the toothed bit of master key 90. It may be necessary to counter-balance the weight of motor 140 and this may be done by means of a counterweight 152 which is adjustably supported on a screw threaded rod 154 secured to carriage 106.

As the carriage moves both forwardly and rearwardly along the axis of shaft 104, its key follower 108 engages and follows the contours of the toothed bit of said master key 90. Since the key cutter 110 will move integrally with said key follower 108, it will cut the key blank 92 in conformity with the toothed contours of the bit of the master key. The cutting operation will take place on the forward movement of the carriage and it will be completed on the rearward movement thereof.

Figure 4:
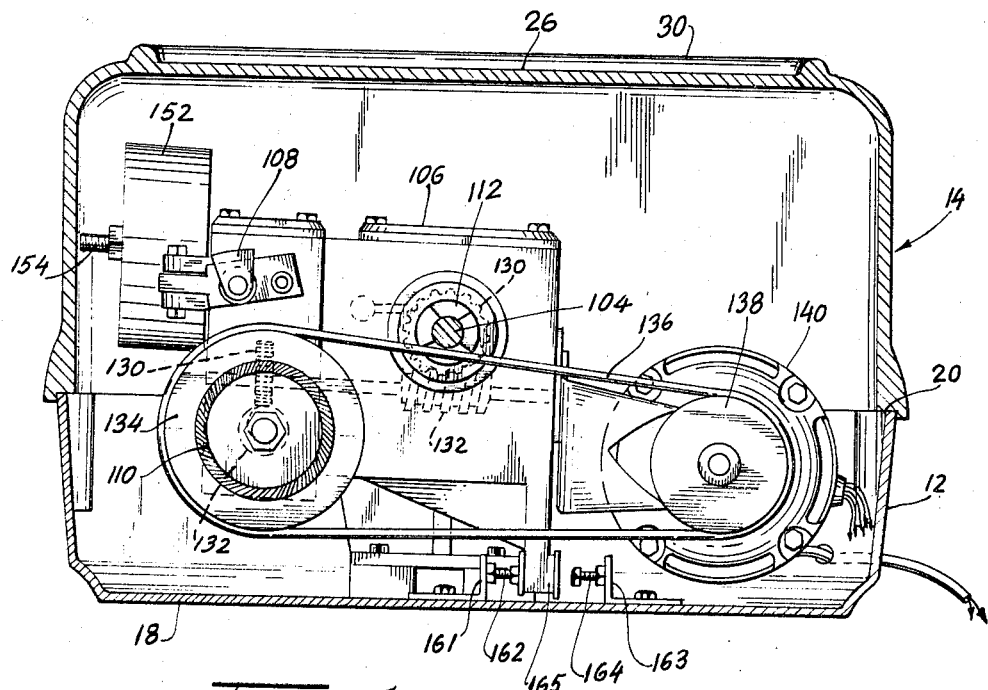
FIGURE 4 is another vertical section on the line 4—4 of FIGURE 1.
Figure 12:
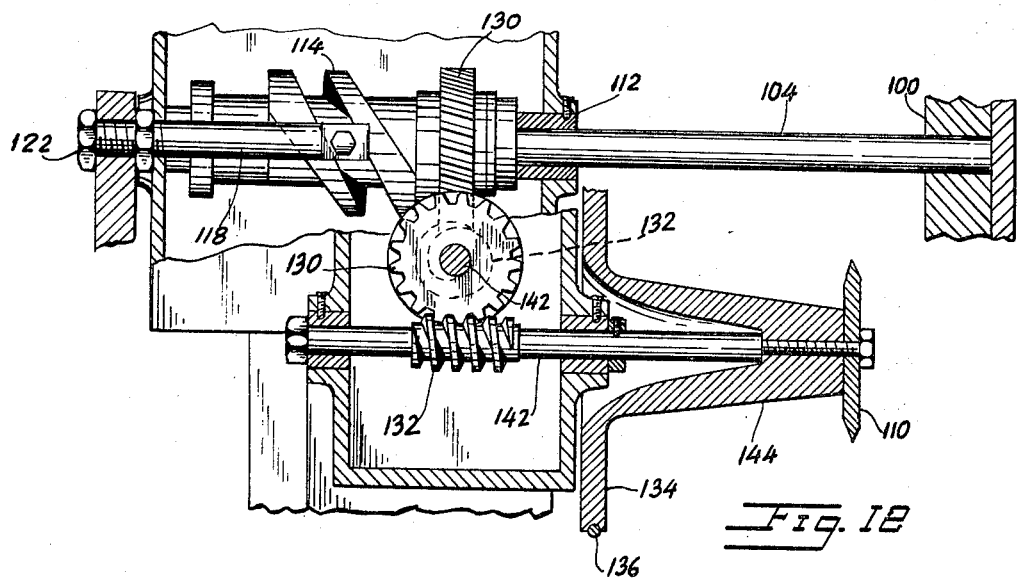
FIGURE 12 is a fragmentary vertical section through the machine showing the key cutting components.
Figure 13:
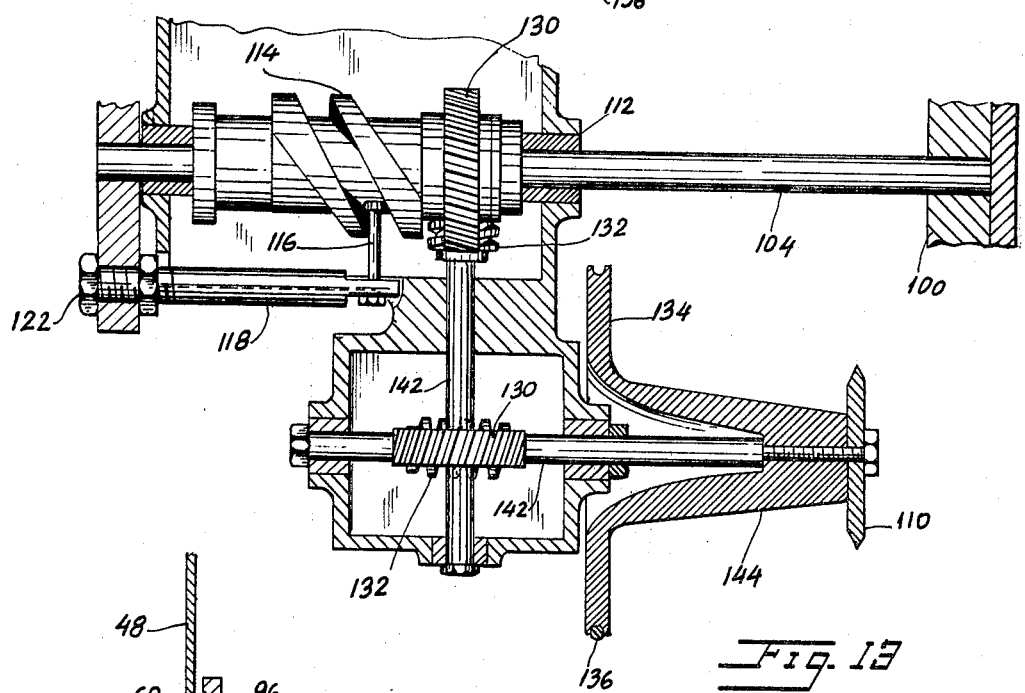
FIGURE 13 is a fragmentary horizontal section showing the key cutting components of FIGURE 12.

To insure proper alignment of the key follower with the master key and the key cutter with the key blank, adjustable stop elements 162 and 164 are provided. These stop elements consist of a pair of adjustable screws mounted on brackets 161 and 163, respectively, which are secured to the bottom wall of housing 12. These two adjustable stop members face each other in spaced relationship and they accommodate a downwardly projecting extension 165 of the carriage between them. As viewed in FIGURE 4, stop member 166 engages extension 165 to prevent clockwise movement about the axis of shaft 104 beyond the point shown in said FIGURE 4. Stop element 164 similarly engages said extension 165 to limit counterclockwise movement of the carriage about the axis of shaft 104 beyond a predetermined point. Stop element 162 may be adjusted so as to insure engagement of key follower 108 with master key 90 and engagement of key cutter 110 with key blank 92. Such position of the key follower and key cutter relative to the two keys is shown in FIGURE 6.

The operation of this machine will be apparent from a discussion of its electrical controls. After the master key and key blank are inserted into their respective clamping jaws, push button switch 160 is manually closed and this closes the circuit to the two solenoids 84 and 86 which are thereby energized to clamp the clamping jaws upon the keys in the manner above described.

Figure 1:
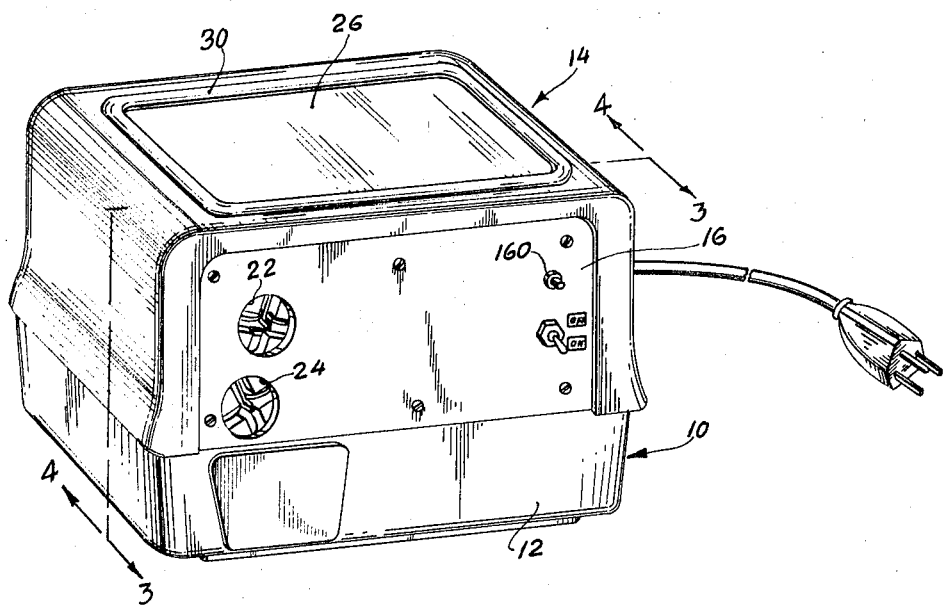
Figure 2:
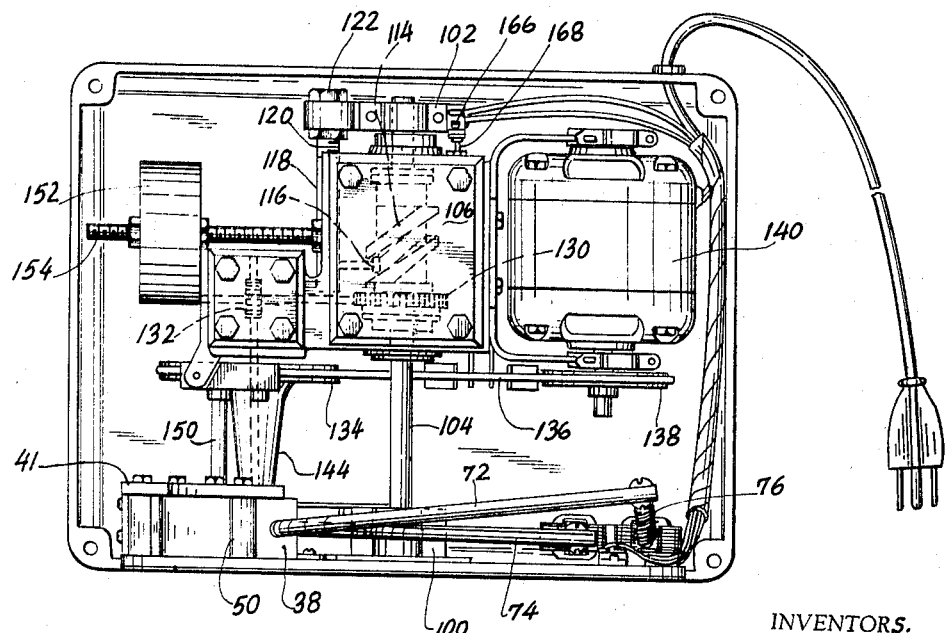
FIGURE 2 is a top view thereof with the cover removed therefrom to expose its working parts.

Switch 160 also controls the motor circuit, and accordingly closing the switch energizes the motor. The carriage is thereby driven forwardly and the key follower engages the master key 90 while the key cutter engages the key blank 92, and the latter is thereby cut in accordance and conformity with the toothed contours of said master key. On the return cycle this cutting operation will be finished and the carriage will move into its rearmost position, as illustrated in FIGURE 2. It will there be seen that a limit switch 166 is provided on bracket 102 and that an adjustable screw 168 is provided on the carriage for engagement with the switch arm of said switch. This switch also controls the circuit to the motor as well as to the two solenoids. It is a normally closed switch which opens only when contact is made between screw 168 and the switch arm of said switch. Accordingly, when the carriage reaches its rearmost position, contact is made with said switch 166 and said switch is accordingly opened. The circuit to the motor and the two solenoids is thereby similarly opened and operation of the machine ceases. It will now be understood that push button switch 160, which starts the operation of the machine, controls a circuit which bypasses limit switch 166. The push button switch, which may now be denoted the starting switch of the machine, is depressed long enough to cause the carriage to disengage limit switch 166, thereby permitting said limit switch to close. Once that switch closes, starting switch 160 may be released since the circuit to the motor and solenoids will now remain closed.

The foregoing is illustrative of a preferred form of this invention and it will be understood that this form may be modified within the broad spirit of the invention and the broad scope of the appended claims.

What is claimed is:

1. In a key duplicating machine, a pair of key clamping jaws, a key supporting plate mounted between said jaws and clamping means adapted to clamp said jaws against said plate and a key mounted between said plate and one of said jaws.

2. The combination of claim 1, wherein the key clamping jaws are provided with tapered facing edges which are engageable with the longitudinal grooves in a key.

3. The combination of claim 1, wherein the key supporting plate is suspended between the key clamping jaws from an elevated pivotal mounting, the pivotal axis being parallel to the clamping edges of the jaws.

4. The combination of claim 1, wherein each of the key clamping jaws is removably mounted on a supporting block, one of said supporting blocks being pivotally mounted for movement of its key clamping jaw into and out of clamping engagement with said key supporting plate and a key mounted between said plate and one of said jaws.

5. The combination of claim 1, wherein two pairs of key clamping jaws and two key supporting plates are provided, one such plate between each pair of jaws, one pair of jaws being adapted to receive a master key between either of its jaws and key supporting plate, and the other pair of jaws being adapted to receive a key blank between one of its jaws and its key supporting plate.

6. The combination of claim 5, wherein a key follower is provided adjacent the master key engaging jaws for engagement with a master key clamped thereby, and a key cutter is mounted adjacent the blank key clamping jaws for engagement with a blank key clamped thereby.

7. The combination of claim 6, wherein a carriage is provided for the key follower and the key cutter, said carriage being mounted for linear movement lengthwise of a master key and key blank clamped between said pairs of jaws and their respective key supporting plates, whereby the key follower and key cutter are movable longitudinally of said master key and key blank, said carriage being also pivotally movable about a longitudinal axis parallel to its path of linear movement, whereby the key follower is adapted to follow the contours of the master key and the key cutter is adapted to cut the key blank in accordance with said master key contours.

8. The combination of claim 7, wherein the key clamping edges of the master key clamping jaws and the blank key clamping jaws are arranged in parallel relation to the pivotal axis of the carriage and radially equidistant therefrom, said key clamping jaws being adapted to clamp said master key and key blank with their respective tooth and ward forming edges and facing downwardly on one side of the pivotal axis of the carriage, said master key follower and said blank key cutter being mounted on said carriage on the same side of its pivotal axis, said carriage being weighted on the opposite side of its pivotal axis to urge said key follower and key cutter into engagement respectively with the said master key and key blank.

9. The combination of claim 8, wherein a shaft is provided to support the carriage in its linear and pivotal movement relative to the key clamping jaws and a cam drive mounted between said shaft and said carriage to drive the carriage toward and away from said key clamping jaws, such linear movement extending a distance of at least the length of the bit of a key.

10. The combination of claim 5, wherein a key stop is provided adjacent each pair of key clamping jaws, the two key stops being connected to each other and being mounted for pivotal movement toward and away from their respective key clamps, whereby the insertion of a master key or a key blank into the corresponding clamping jaws will cam both key stops out of the way of both the master key and the key blank.

References Cited

UNITED STATES PATENTS 2,682,809  7/1954  May _____ 90—13.05

GERALD A. DOST, *Primary Examiner.*